Patented July 2, 1940

2,206,597

UNITED STATES PATENT OFFICE 2,206,597

COATING METAL ARTICLES

Jesse J. Canfield and George W. McGohan, Middletown, Ohio, assignor to The American Rolling Mill Company, Middletown, Ohio, a corporation of Ohio No Drawing. Original application April 7, 1934, Serial No. 719,593. Divided and this application December 7, 1937, Serial No. 178,558

3 Claims. (Cl. 91—73)

This application is a division of our application, Ser. No. 719,593, filed April 7, 1934, and covering a ferrous product for enameling and process for the preparation thereof.

As is well known, iron or steel sheets in the operation of coating them with vitreous enamel, after having been cleaned, are covered with a so-called frit, which is a ground-up glassy product reduced to a pasty or creamy form with a liquid such as water. The coated product is then dried so as to drive out the liquid and ultimately heated to fuse the glassy substance on the surface of the iron. The phenomenon of reboiling, while it occurs in other enameling operations, is particularly apparent and particularly troublesome in the making of white enamel products. In the making of such products the usual procedure is to employ a ground coat, which for the sake of adhesion to the iron base, contains nickel and cobalt compounds, and therefore is dark blue in color. Upon this ground coat usually two or more coats of white vitreous enamel are subsequently applied and fired. When the ground coat is applied as described, and is fired, there is an initial boiling or bubbling action, which however, presently stops and the glassy substance fuses down into a solid and smooth mass of coating upon the iron. When subsequently heated, however, (and this is usually done in connection with the application of an over-lying coat or coats of white enamel), the base coat is likely to reboil. When it reboils, bubbles are formed in the ground coat, which due to their expansion either break through or are covered by a thin layer, only, of the white coat. The bubbles thus cause black specks either caused by an underlying bubble, the thinness of the white coat, or spots of the ground coat carried into the white coat. The final product will be characterized either by a pock-marked surface, a pitted surface and/or numerous black specks. Reboiling is thus very undesirable in an enameled article, and is a major source of rejected articles or parts.

The immediate mechanism of reboiling is subject to considerable controversy. Some have maintained that the reboiling is the result of gases generated in or derived from the metal base. Others have maintained that gases are generated in or derived from the enamel itself. Still others maintain that reboiling is due in major part at least, to a cracking of the original enamel coat, which cracks become filled with air or other gases. Upon a subsequent firing these cracks seal over at the top and trap the air or gases, and when the enamel softens these gases collect in the form of bubbles. We are inclined to favor the last explanation as being the most plausible one.

In the course of our researches, we have found however, that a number of factors seem to have a bearing upon the phenomenon of reboiling, whereas others do not. We will take up the salient ones in order.

The matter of strain in the enamel coat appears to have a fundamental effect upon reboiling. We do not know whether this effect is bound up with the production of cracks in the enamel due to stresses; but without wishing to be bound by theory, are inclined to believe that this is so. For example, if a stock normally subject to reboiling is coated upon both sides with enamel, it will exhibit this phenomenon. If it is coated upon one side with the enamel, reboiling will not occur. If the stock is coated on both sides with the enamel and fired and cooled, and the enamel is subsequently ground away or otherwise removed from a portion of one side thereof, it will reboil as before upon the first subsequent heat; if it is again cooled and reheated, however, it will not reboil, over that portion from the opposite side of which the enamel has been removed. Subsequent to these discoveries on our part, investigators approaching the problem from the standpoint of enameling procedure, have found that firings including a very slow heating, and a very slow cooling, amounting to all intents and purposes to an annealing treatment of the enamel, are effective in mitigating or eliminating reboiling tendencies.

As to the nature of the enamel, the best results are secured through the use as a ground coat at least, of an enamel, the coefficient of expansion of which is not too far removed from the coefficient of expansion of iron. As is well known in the art, the practice is to make up a soft frit and a hard frit, and to mix these together in certain proportions to give, after fusion, a glass of the qualities desired. It is the usual, but not the invariable practice, to use a ground coat of a higher fusion point than the cover coats which are subsequently applied. Our process and product seem to be effective throughout the range of ordinarily used enamels, and to give a marked betterment of results with all of them. The best results as hereinabove stated, are secured when the coefficient of expansion of the glass is as near as possible to, but not above that of the base metal.

As a consequence of these considerations in the practical application of our invention, we start with a piece of commercially pure iron or ingot iron, which is low in carbon, and which preferably is homogeneous as to inclusions. From the standpoint of the sheet manufacturer, the most important factor in reboiling is the matter of strain. It is the fundamental object of our invention to provide a non-reboiling ferrous stock for enameling uses, and in particular a stock which will give an enameled product substantially all of which will be of useful character. We have succeeded in the practice of our invention in making large orders of iron sheets for enameling use, which uniformly give usable products without rejects, and which when enameled, will produce 85% or above, of commercially perfect enameled articles.

If a piece of iron is cold worked, as by a reduction above 10%, and is then enameled without further treatment excepting a cleaning, it will be found to be non-reboiling. With a cold work above 20% and preferably of 40%-50%, the normalizing treatment required to recrystallize such a material, to commercial workability, does not deprive the metal of this non-reboiling capacity.

We have found that a ferrous product which is drastically cold worked and then heat treated, with or without skin passing for flatness or surface characteristics, becomes to all intents and purposes, non-reboiling. This cannot be said of heat treated products which have not been drastically cold rolled.

In the formation of our product therefore, we take commercially pure iron which has been reduced to sheet or plate form, by any process desired, usually by a hot rolling process, and we cold roll this material with drastic reductions to gauge or substantially to gauge. By drastic cold rolling, we mean cold rolling treatments greater than 10% and preferably at least 40% or 50%.

The next step will be to heat treat the product. This may be done either by an annealing procedure or by a normalizing and annealing. If an annealing is attempted, as in a box, it will be preferable to use a means to keep the sheets from sticking together, since a high temperature should be used, and preferably a temperature above the recrystallization point of the metal. For commercial reasons, we prefer to normalize in the continuous furnace. By a normalizing we mean a rapid heating of the product to above its $A_3$ point, or recrystallization point, followed substantially immediately by a quick cooling in air. The result of the process is a fine grained product in which, theoretically at least, the stresses produced by the cold rolling treatment have been relieved.

The next procedure will be to pickle or clean the stock, which may be done in the usual manner. If the drastic cold rolling hereinabove referred to has been carried on to gauge, and if the product is otherwise suitable for the use intended, it may thereupon be used as enameling stock. Generally however it is desirable to give the product a further cold rolling or skin passing treatment for the sake of flatness or finish. This skin passing should not involve any great reduction, and preferably it should not involve a reduction of over 1 to 3% in gauge.

We have indicated hereinabove the phenomena of reboiling appears primarily to be concerned with the nature of the metal base. Nevertheless, the matter of bond or adherence of the enamel to the base metal not only has its own commercial importance, but is important to a practical degree in the prevention of reboiling. Consequently, our invention contemplates, since it is concerned primarily with the manufacture of non-reboiling stock insofar as the sheet maker can control it, the further provision of means promoting adherence, and thereby to a degree lessening the reboiling tendency.

For the promotion of adherence, the best methods that we know of are either the use of an etching procedure which results in the production of deep, sharp edged pits essentially related to and following the crystalligraphic structure of the metal, or the use of a process of imposing nickel or a similar adhesion-promoting substance, on the base metal. An acid etching treatment is described in our Patent No. 2,032,256, dated February 25, 1936. This method, briefly stated, is to treat the enameling stock with an acid in the presence of an oxidizing agent.

The oxidizing agent may consist of ferric salts, such as ferric sulphate or chloride or nitrate. These ferric salts may be produced by the action of nitric acids, chlorates, chromates or other oxidizing agent on ferrous salts, the fundamental condition required being that a sufficient concentration of an oxidizing agent be maintained in the presence of moderate concentrations of an acid to maintain concentrations of ferric salts in the neighborhood of 5% or greater.

After being cold rolled the sheets are pickled and passed through the usual annealing, whereupon they are ready for etching.

We have used with success a 40 seconds immersion in 8% nitric acid solution at room temperature.

An etching such as is set forth above, results in dissolving the iron or steel preferentially along crystallographic planes within the grains, said planes being different for different grains, thus developing a multitude of planar surfaces at an angle to the surface of the metal. This etching results in a surface having sharply angled, tiny teeth, instead of the more or less rounded and shallow indentations resulting from ordinary pickling, even if radically applied. The sharp tooth produced by the nitric acid etching gives a velvety appearance to the product, which under the microscope reveals the sharp edges, and it is this particular surface which we have found gives the great advantages in improved bond, that we have described. Concentration of the acid, temperature of the acid, etc., may be varied, the particular example given being one which develops the type of surface desired. In metallographic work, prior to use of X-rays, such an etching has been used for study of crystallization habits. Hence we have termed the type of etching "crystallographic" etching.

After the etching has been finished, it is necessary to thoroughly clean and neutralize the surface of the sheet. We have with success scrubbed the sheets under running water and then neutralized with 2% tri-sodium phosphate solution followed by artificial drying. Normally a black scum will be left on the metal by the etching unless thorough scrubbing and neutralizing is practiced.

We find that it is of advantage in removing this scum to treat the sheet with a dilute solution of sodium nitrate in sulphuric acid, such, for example, as a solution of 5% $H_2SO_4$ and 2% $NaNO_3$ at room temperature for five minutes. changes in concentration and temperature will permit a shortening of time even to the extent of using a spray.

In the co-pending application of George W. McGohan, one of the inventors in this case, Serial No. 716,674, filed March 21, 1934, there is set forth a process of producing a coating of nickel or other adhesion promoting metal on the surface of the base metal for enameling use, which treatment is believed to result primarily in the production of an alloy of iron and the adhesion promoting metal. Essentially this treatment involves cleaning the metal, and then imposing upon the surface thereof a coating of nickel salt. The metal is then subjected to a heat treatment which results in the decomposition of the metal salt, and the formation of an alloy on the surface of the base metal, it is believed. A pickling usually follows the heat treatment, and has for its purpose primarily the decomposition of any compounds of iron or the adhesion-promoting metal which would interfere with the enameling process or adversely affect the condition of the enamel during firing.

An exemplary treatment is the dipping of sheets into a solution containing 3-5% of nickel sulphate, afterward drying the sheets rapidly so as to deposit the salt from the solution on the surfaces thereof, and then heating the metal to a temperature of at least around 1100° F.

In carrying on this proces, it has been found that the nickel coating may be imposed upon the surfaces of metal pieces which have not been reduced to final gauge. It is even possible to coat sheet bars, rough plate or the like with nickel in this way, afterward reducing the metal by hot or cold processes. As hereinabove stated, the process of making our preferred non-reboiling stock involves a drastic cold rolling; but this cold rolling may follow a previous hot rolling of sheet bar, rough plate, or the like, and it will be clear from what has just been said that the nickel salt may be placed upon the surface of the metal pieces practically at any stage in the process of preparing enameling stock, either before or after reduction to gauge, and further, that the heat treatment need not be a special heat treatment for the purpose, but can be a heat treatment incident to the process of reducing the metal. Thus if the metal salt has been imposed upon the surface of the metal prior to or just following the drastic cold rolling hereinabove referred to, the normalizing or box-annealing treatment may be relied upon to fix the nickel upon the surface of the sheets. If, however, the nickel salt is imposed upon the otherwise finished sheets, then a separate heat treatment will be necessary to fix it on the surface thereof.

The enameling procedure itself as applied to the product produced as now disclosed, will preferably be as heretofore stated, the application of the ground coat with a heating, so as to fuse the glassy surface thereof on the surface of the iron, followed usually by two or more coats of white vitreous enamel frit, when the final product is to be white, with the usual ensuing heating or firing. Preferably, as already stated, it is desirable to use a vitreous enamel, a coefficient expansion of which, when fired, is as near as possible to, but not above that of the base metal. The result of our practice is that the base metal rapidly develops a useful amount of surface oxide upon the first firing and this appears to be beneficial in avoiding reboiling. Our practice also simplifies the enameling procedure, in view of the fact that slow heatings and coolings need not be followed. The adhesion-promoting treatments, which we provide, while mainly intended to counteract the undesirable smoothness of the cold rolled surface from the point of the adhesion appear to have a marked, although not a primary, effect upon reboiling characteristics.

Having thus described our invention, what we claim as new and desire to secure by Letters Patent, is:

1. The process of producing an enameled article, which comprises preparing a deep drawing sheet of commercially pure ingot iron, cold rolling the said sheet to an amount at least equal to 20%, permanently modifying the typical cold rolled surface to make it tightly adherent to vitreous enamel, and finally applying a vitreous enamel coat to said product, whereby the product is made free of reboiling defects during said enameling step.

2. The process of producing an enameled article, which comprises preparing a deep drawing sheet of commercially pure ingot iron, cold rolling the said sheet to an amount at least equal to 20%, permanently modifying the typical cold rolled surface to make it tightly adherent to vitreous enamel by forming therein deep, sharp edged pits along crystallographic planes, and finally applying a vitreous enamel coat to said product, whereby the product is made free of reboiling defects during said enameling step.

3. A process of producing an enameled article, which comprises preparing a deep drawing sheet of commercially pure ingot iron, cold rolling the said sheet to an amount at least equal to 20%, permanently modifying the typical cold rolled surface to make it tightly adherent to vitreous enamel by imposing nickel on said surface, which nickel is caused to alloy in part at least with the iron as a film coat, and finally applying a vitreous enamel coat to said product, whereby the product is made free of reboiling defects during the enameling step.

JESSE J. CANFIELD.
GEORGE W. McGOHAN.